United States Patent
Reynolds

(10) Patent No.: US 11,737,441 B1
(45) Date of Patent: Aug. 29, 2023

(54) SYSTEMS AND METHODS FOR ALBERTO KNOT TYING APPARATUS

(71) Applicant: James J. Reynolds, Oakdale, CA (US)

(72) Inventor: James J. Reynolds, Oakdale, CA (US)

(*) Notice: Subject to any disclaimer, the term of this patent is extended or adjusted under 35 U.S.C. 154(b) by 0 days.

(21) Appl. No.: 17/727,721

(22) Filed: Apr. 23, 2022

(51) Int. Cl.
*A01K 91/04* (2006.01)
*B65H 69/04* (2006.01)

(52) U.S. Cl.
CPC ............. *A01K 91/04* (2013.01); *B65H 69/04* (2013.01)

(58) Field of Classification Search
CPC ....... B65H 69/04; A01K 91/04; A01K 91/047
USPC .......................................................... 289/17
See application file for complete search history.

(56) References Cited

U.S. PATENT DOCUMENTS

| | | | | |
|---|---|---|---|---|
| 2,773,713 A * | 12/1956 | Smalley | ................. | A01K 91/04 289/17 |
| 2,843,961 A * | 7/1958 | Semple | ................. | A01K 91/04 289/17 |
| 2,947,558 A * | 8/1960 | Bethune, Jr. | ........... | A01K 91/04 289/2 |
| D211,685 S * | 7/1968 | Hill | ................................. | 289/17 |
| D219,021 S * | 10/1970 | Graber | ................................. | 43/4 |
| 3,572,788 A * | 3/1971 | Cruzan | .................. | B65H 69/00 289/17 |
| 3,756,638 A * | 9/1973 | Stockberger | ......... | A01K 91/047 289/17 |
| 3,877,737 A * | 4/1975 | Chappell | ................. | A01K 91/04 289/17 |
| 4,607,869 A * | 8/1986 | Bersche | .................. | A01K 91/04 289/17 |
| 5,240,295 A * | 8/1993 | Spencer | ............... | A01K 91/047 289/1.5 |
| 5,690,369 A * | 11/1997 | Steck, III | ............... | B65H 69/04 289/17 |
| 6,322,112 B1 * | 11/2001 | Duncan | ................... | A01K 91/04 7/106 |
| 8,511,721 B1 * | 8/2013 | Farner | .................... | A01K 91/04 289/17 |
| 8,511,722 B1 * | 8/2013 | Farner | .................... | A01K 91/04 289/17 |
| 8,794,680 B2 * | 8/2014 | Frew | ...................... | B65H 69/04 289/17 |
| 10,118,793 B1 * | 11/2018 | Jochum | ................. | B65H 69/04 |

(Continued)

FOREIGN PATENT DOCUMENTS

JP    2011004726 A  *  1/2011

*Primary Examiner* — Shaun R Hurley

(57) ABSTRACT

Tool is an apparatus for tying fishing line of dissimilar and similar types together. It has a base frame to allow a person to hold the unit or secure to a stationary object with clamps or vice. Base Frame is a "C" shape fabricated from material to hold shape and pressure including wood, plastic, metal, or composite. Top "C" end one of base frame and top "C" end two of base frame have cleats that can be made from neoprene type of compressible material, silicon, including other material that will not damage filament. These cleats secure and align the line for tying. Using short post two with obtuse angle located at "C" end one point and high post one 90-degree angle on opposite "C" end these posts hold filament while the cleats hold the filament secure and steady. The post is used for wrapping similar and dissimilar line around when tying knot. This allows consistent secure tying from unit.

3 Claims, 3 Drawing Sheets

(56) References Cited

U.S. PATENT DOCUMENTS

2015/0264908 A1* 9/2015 Banda .................... A01K 91/04
                                                    289/1.5
2022/0049385 A1* 2/2022 Ng ........................ D03D 29/00

* cited by examiner (section A-A)

SYSTEMS AND METHODS FOR ALBERTO KNOT TYING APPARATUS

FIELD OF THE INVENTION

The present invention relates knot tying tools, and more particularly, to a knot tying tool for tying of a breakproof knot to attach or tie fishing lines together of dissimilar types and similar types of material.

BACKGROUND

For centuries, knots provide useful means for fastening or securing linear material such as strings, webbings, twines, straps, threads, lines, or ropes through specific combinations of tying or interweaving. The knot may include one or more segments that are interwoven to bind to itself or to some other object (or the load). Knots are used in various domestic, recreational, occupational, and industrial settings. One particular area where the knot has been an essential implement is fishing. Fishing lines and fishhooks have been used for centuries by fishermen to catch fresh and saltwater fish. Fishhooks are typically attached to a line or lure device through some form of a knot, which ultimately connects the fish caught to the fisherman.

Modern fishing lines intended for spinning, spin cast, or bait casting reels are almost entirely made from artificial substances, including nylon, polyethylene, Dacron and the like. The most common type is monofilament, which is in the form of a single-stranded line. Other alternatives to standard nylon monofilament lines are those made of copolymers or fluorocarbon, or a combination of the two materials including braided line.

Such fishing lines typically exhibit a small diameter, minimal stretch, and good strength with relatively smooth exteriors, which may cause the lines to be difficult to handle and to require complex knots to ensure the maximum strength of the line at the knot and to prevent the knot from slipping or coming loose during use. In attaching dissimilar lines or similar lines, it has been a common practice for fishermen to use their hands to hold the object to which the line is to be tied while manipulating the line to form these complex knots. Frequently fishermen face considerable difficulties in correctly tying these complex knots.

The predominant consideration in knot selection is many yearning anglers from participating in the same. whether the knot will decrease the breaking strain of the line. Such a decrease in the breaking strain is undesirable because the hook may detach from the line after a sudden or severe jolt in the same, a frequent occurrence during fishing.

It has been found that the Alberto knot provides a great amount of knot strength and is therefore one of the most common knots used by anglers. An Alberto knot maintains approximately ninety percent of its breaking strain. It is understood that the breaking strain of a line diminishes when there is a great deal of bending and twisting of the line, and when a Alberto knot is tied, the main portion of the line is not bent at all, preventing the introduction of kinks therein and preserving its breaking strain. Another advantage of the Alberto knot is that is can be used by both freshwater and saltwater anglers.

Therefore, there is a need to develop a knot tying tool suitable for tying of a knot to attach a line to an object or line having in a manner that requires minimal handling of the object and is suitable for those with limited dexterity. There is a further need to develop a knot tying tool designed as a compact, hand-holdable device capable of tying a knot that is breakproof and eliminates weaking of the line at the knot. There is a further need to develop a knot tying tool that provides a safe, simple, easy to use device for assisting a user especially in tying knots for dissimilar line material or similar line material.

SUMMARY OF INVENTION

The present invention relates generally to a knot tying tool for tying knots in cords or lines of material including those for attaching the similar and dissimilar line types. The knot tying tool of the present invention is designed to provide a compact, hand-holdable device that is simple and convenient to use, and easy to carry and store. The knot tying tool of the present invention is adapted to enable a user to tie a knot that is breakproof. The knot tying tool is further adapted to form knots in a manner that eliminate weakening of the line at the knot and limits the slipping or loosening of the knot during use. The knot tying tool of the present invention is further designed to facilitate the ease and accuracy of knot tying the complex knot, especially for those with limited dexterity including, for example, children and elderly users. In particular, the knot tying tool of the present invention is especially useful for operation by fishermen under various adverse conditions including wet and cold conditions. The knot tying tool of the present invention is further simple and inexpensive to fabricate and implement.

In one embodiment of the present invention, there is provided a knot tying tool for tying knots in cords or lines of material including those for attaching the line of dissimilar line or similar line material, the knot tying tool comprising:

a base member having a "C" shape with first and second points;

a first post extending from the first point of the "C" base member with a right angle 90 degrees at post base;

a second post extending from the second point of the "C" base member with a obtuse angle at least 88 degrees at post base creating a loop retaining mechanism;

a first filament retaining mechanism at base member top of tool;

a second filament retaining mechanism at base member top of tool opposite end;

a loop retaining mechanism operatively associated with the second post for retaining a portion of one loop of a line forming part of a knot being tied, wherein the line includes a working end and a standing end; and a support member operatively associated with the first post;

BRIEF DESCRIPTION OF THE DRAWINGS

For a more complete understanding of the present disclosure and its advantages, reference is now made to the following description, taken in conjunction with the accompanying drawings. It is emphasized that, according to common practice, the various features of the drawings are not necessarily to-scale. On the contrary, the dimensions of the various features may be—and typically are—arbitrarily expanded or reduced for the purpose of clarity.

DETAILED DESCRIPTION OF ILLUSTRATIVE EMBODIMENTS

The present invention is directed generally to a knot tying tool for tying knots in cords or including those for attaching the dissimilar material lines or similar material line. The knot tying tool of the present invention is designed to provide a compact, hand-holdable device that is simple and convenient to use, and easy to carry and store. The knot tying tool of the present invention is adapted to enable a user to tie a knot that is breakproof. The knot tying tool is further adapted to form knots in a manner that eliminates adverse weakening of the line at the knot and limits the slipping or loosening of the knot during use. The knot tying tool of the present invention is further designed to facilitate the ease and accuracy of tying the complex knot, especially for those with limited dexterity including, for example, children and elderly users. In particular, the knot tying tool of the present invention is especially useful for operation by fishermen under various adverse conditions including wet and cold conditions. The knot tying tool of the present invention is further simple and inexpensive to fabricate and implement.

Figure 1:
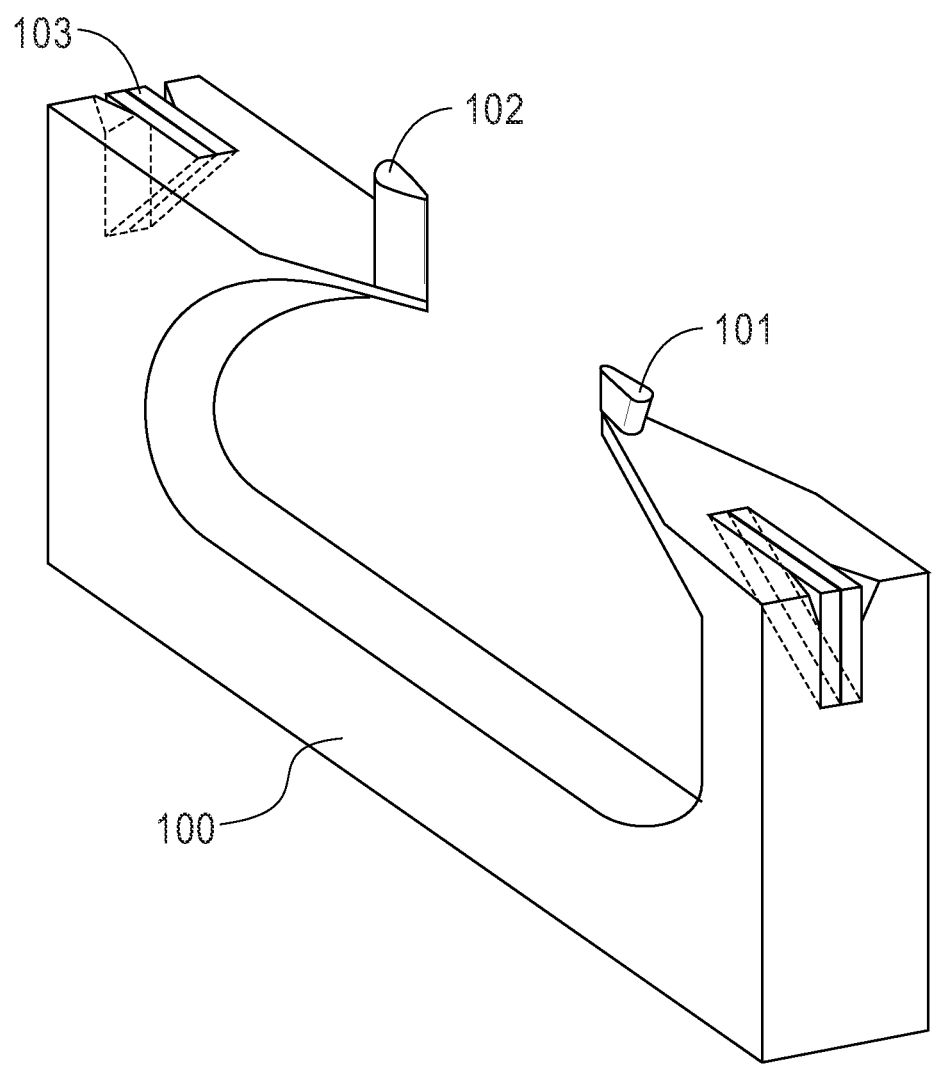
FIG. 1 is a isometric front view of a knot tying tool embodiment of the present invention.

Referring to FIG. 1, a knot tying tool designed for facilitating tying of a knot including a breakproof knot to attach a similar and dissimilar line to shown for one embodiment the present invention. FIG. 1, 100 is a rectangle apparatus with the middle section of one of the longer sides open and the center of the tool void of material to represent a "C" shape opening. FIG. 1, 100 also displays on the side that has the opening end 1 represented by cleat 103 and end 2 opposite location. Said end 1 and end 2 display the cleat mechanism for holding the line in a secure noncompromising manner. These ends include variable layers of soft pliable material such as rubber to hold the differing thickness of line required during the knot tying process. FIG. 1, 102 display the holding post 1 that is at the tip of one point of the "C" shaped opening. 102 is a teardrop shape with a 90 degree angle to the base material of the apparatus 100. FIG. 1, 101 is holding post 2 which is located at the opposite tip from holding post 1 and of the "C" shaped opening. 101 is a teardrop shape with a obtuse angle starting at least 88 degrees to the base material of the apparatus 100.

Figure 2A:
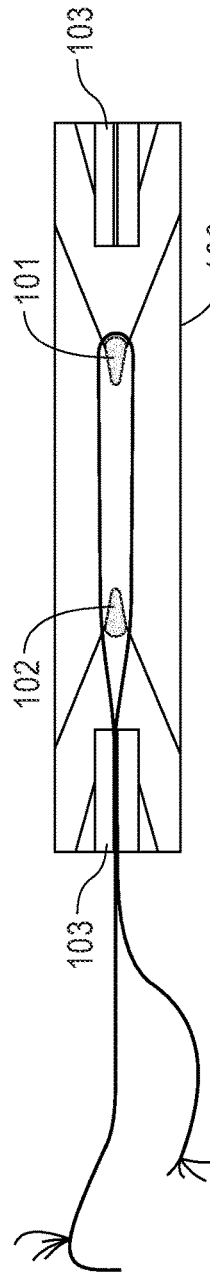
FIG. 2A to 2D comprise illustrations showing the steps of a method for tying knots in cords or lines of material including those for attaching the similar and dissimilar line types for the current embodiment of the present invention.
Figure 2B:
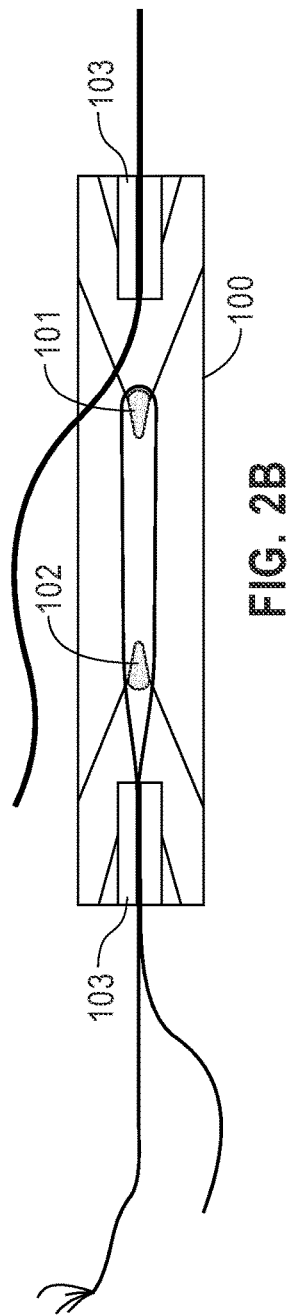
Figure 2C:
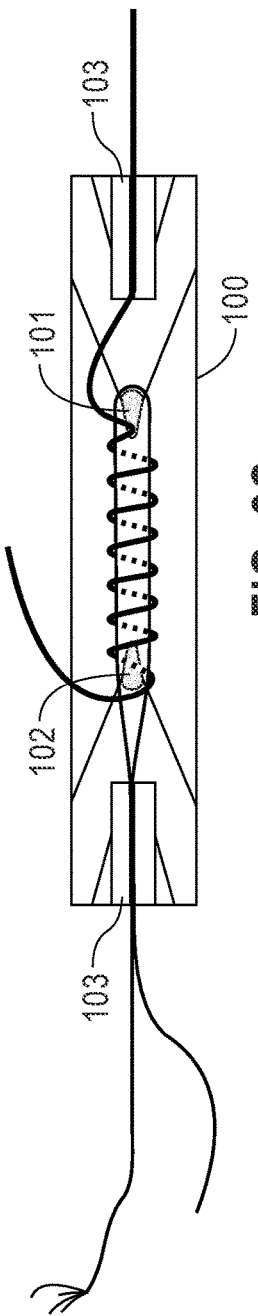
Figure 2D:
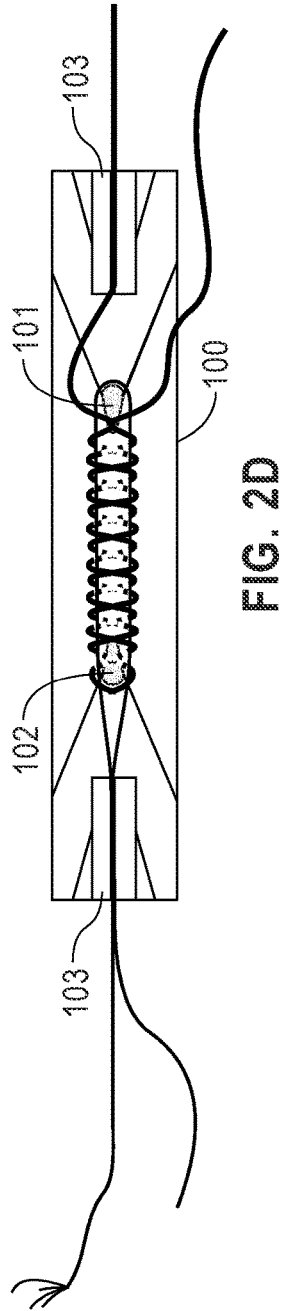

FIG. 2A-2D demonstrate the use of tying the knot. FIG. 2A shows putting the primary line around the smaller holding post 101 and cleating opposite side with 103. FIG. 2B uses between 8 to 10 inches of secondary line, that is using cleat 103 on opposite side near holding post 101. With secondary line material insert up between primary line material on holding post 101 to begin the wrap secondary line material. Make 5 or more wraps as shown in FIG. 2C evenly for expected consistent strength towards holding post 102 wrap around post 102 and return additional wraps toward holding post 101 evenly as shown in FIG. 2D with secondary line insert down through primary line material. knot is now tied. Uncleat knot. Dampen the knot with water lightly and pull the primary line material and secondary line simultaneously and evenly until the knot is compressed. Trim standing ends on both primary and secondary lines evenly. This completes the tying Alberto Knot for use.

Figure 3:
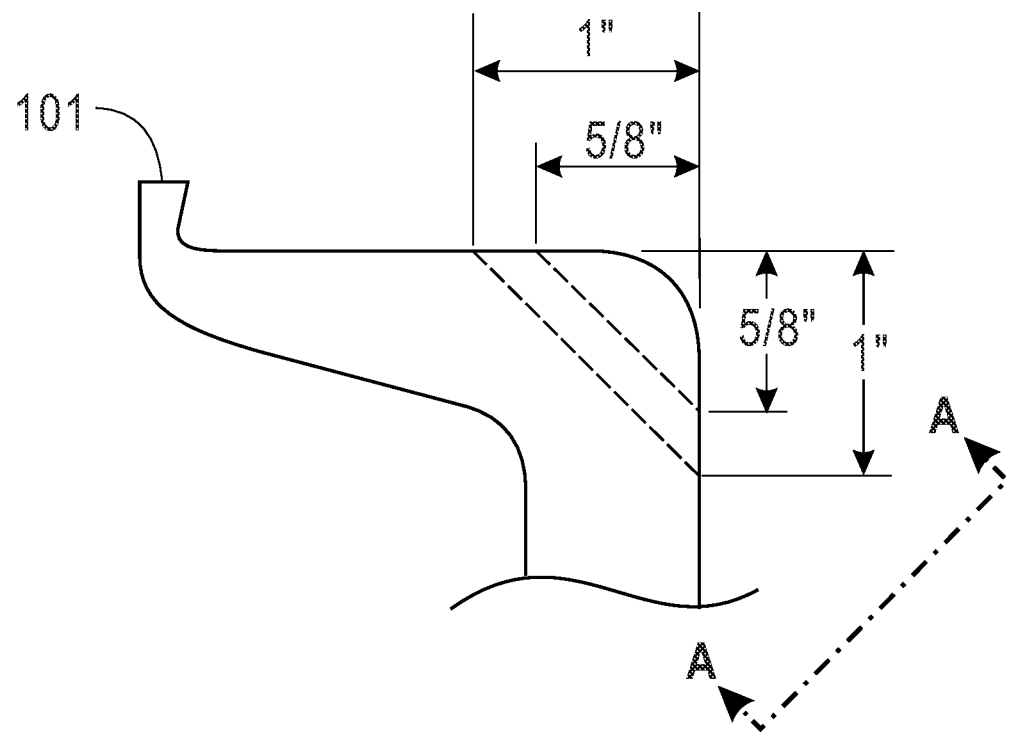
FIG. 3 is an exploded assembly view of retaining mechanism knot tying tool in accordance with the present invention.
Figure 3A:
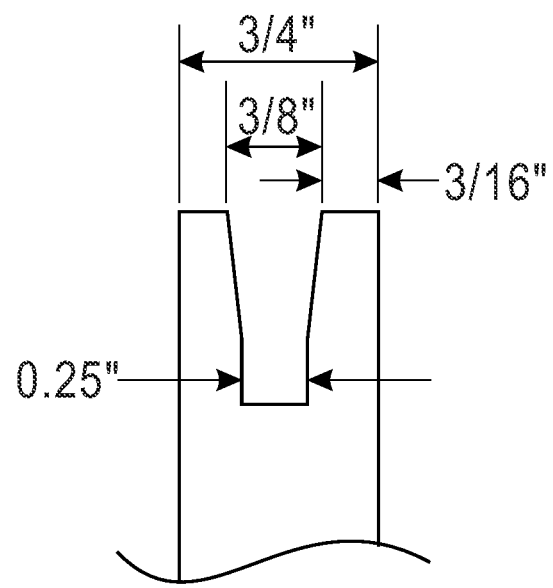
FIG. 3A is an exploded detailed longitudinal view of retaining mechanism in accordance with the present invention.

FIG. 3 and FIG. 3A show the cleat mechanism that is manufactured into the apparatus. Cleat 103 not shown for clarity, neoprene type of compressible material, silicon, including other material that will not damage filament.

The foregoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

What is claimed:

1. A knot tying tool for tying knots in cords or lines of material including those for attaching a line to dissimilar line or similar line material, said knot tying tool comprising:
   a base member having a "C" shape with first and second points;
   a first holding post having a teardrop shape extending from the first point of the "C" base member with a right angle of 90 degrees;
   a second holding post having a teardrop shape extending from the second point of the "C" base member with an obtuse angle of at least 88 degrees;
   wherein the second holding post is smaller than the first holding post;
   a first filament retaining mechanism at a top of the base member at an end;
   a second filament retaining mechanism at the top of the base member at an opposite end from the first filament retaining mechanism;
   wherein the first filament retaining mechanism is a first cleat retaining mechanism operatively associated with the first holding post for separation and alignment of a primary line forming part of a knot being tied, wherein the line includes a working end and a standing end; and
   wherein the second filament retaining mechanism is a second cleat retaining mechanism operatively associated with the second holding post for retaining secondary material of a line forming part of a knot being tied, wherein the line includes a working end and a standing end.

2. The device of claim 1, wherein the first and second filament retaining mechanisms are formed of neoprene, silicone, or other suitable materials capable of compression.

3. The device of claim 1, wherein the first and second filament retaining mechanisms are formed of dual pieces of neoprene, silicone, or other suitable materials capable of compression.

\* \* \* \* \*